US010523734B2

(12) United States Patent
Finocchiaro et al.

(10) Patent No.: US 10,523,734 B2
(45) Date of Patent: Dec. 31, 2019

(54) METHOD FOR THE RECOVERY OF CONTENT CORRESPONDING TO A URL ADDRESS BY A CLIENT DEVICE

(71) Applicant: EUTELSAT S A, Paris (FR)

(72) Inventors: Daniele Vito Finocchiaro, Paris (FR); Antonio Arcidiacono, Paris (FR)

(73) Assignee: EUTELSAT S A, Paris (FR)

( * ) Notice: Subject to any disclaimer, the term of this patent is extended or adjusted under 35 U.S.C. 154(b) by 554 days.

(21) Appl. No.: 14/438,297

(22) PCT Filed: Oct. 16, 2013

(86) PCT No.: PCT/EP2013/071650
§ 371 (c)(1),
(2) Date: Apr. 24, 2015

(87) PCT Pub. No.: WO2014/063971
PCT Pub. Date: May 1, 2014

(65) Prior Publication Data
US 2015/0295987 A1    Oct. 15, 2015

(30) Foreign Application Priority Data

Oct. 26, 2012 (FR) ..................................... 12 60262

(51) Int. Cl.
*H04L 29/08* (2006.01)
*H04N 21/61* (2011.01)
(Continued)

(52) U.S. Cl.
CPC .......... *H04L 67/02* (2013.01); *G06F 16/9566* (2019.01); *G06F 16/986* (2019.01);
(Continued)

(58) Field of Classification Search
CPC ....... H04L 67/02; H04L 67/141; H04L 67/42; H04L 63/123; G06F 17/30887;
(Continued)

(56) References Cited

U.S. PATENT DOCUMENTS 6,199,107 B1 *  3/2001  Dujari ............... G06F 17/30902
                                                         707/E17.12
6,332,158 B1 * 12/2001  Risley ............... G06F 17/30887
                                                         707/E17.115
(Continued)

FOREIGN PATENT DOCUMENTS

EP      2 480 004 A2    7/2012
WO   WO 2011/076791 A1  6/2011

OTHER PUBLICATIONS

International Search Report as issued in International Patent Application No. PCT/EP2013/071650, dated Nov. 28, 2013.

*Primary Examiner* — Sargon N Nano
(74) *Attorney, Agent, or Firm* — Pillsbury Winthrop Shaw Pittman LLP

(57) ABSTRACT

A method for recovering content such as an HTML page corresponding to a URL address by a client device, includes, based on a URL address corresponding to the content, the client device checks for the presence of the content of the URL address in a cache memory of the client device; in absence of the content of the URL address in the cache memory, the client device creates a short message including the URL address; the message is transmitted to a server device by a one-way transmission protocol without establishment of a connection; the server device downloads the content corresponding to the URL address from the internet network; the content is transmitted to the client device by the server device via a one-way protocol with coding without acknowledgement; the content is received by the client
(Continued)

Figure 1:
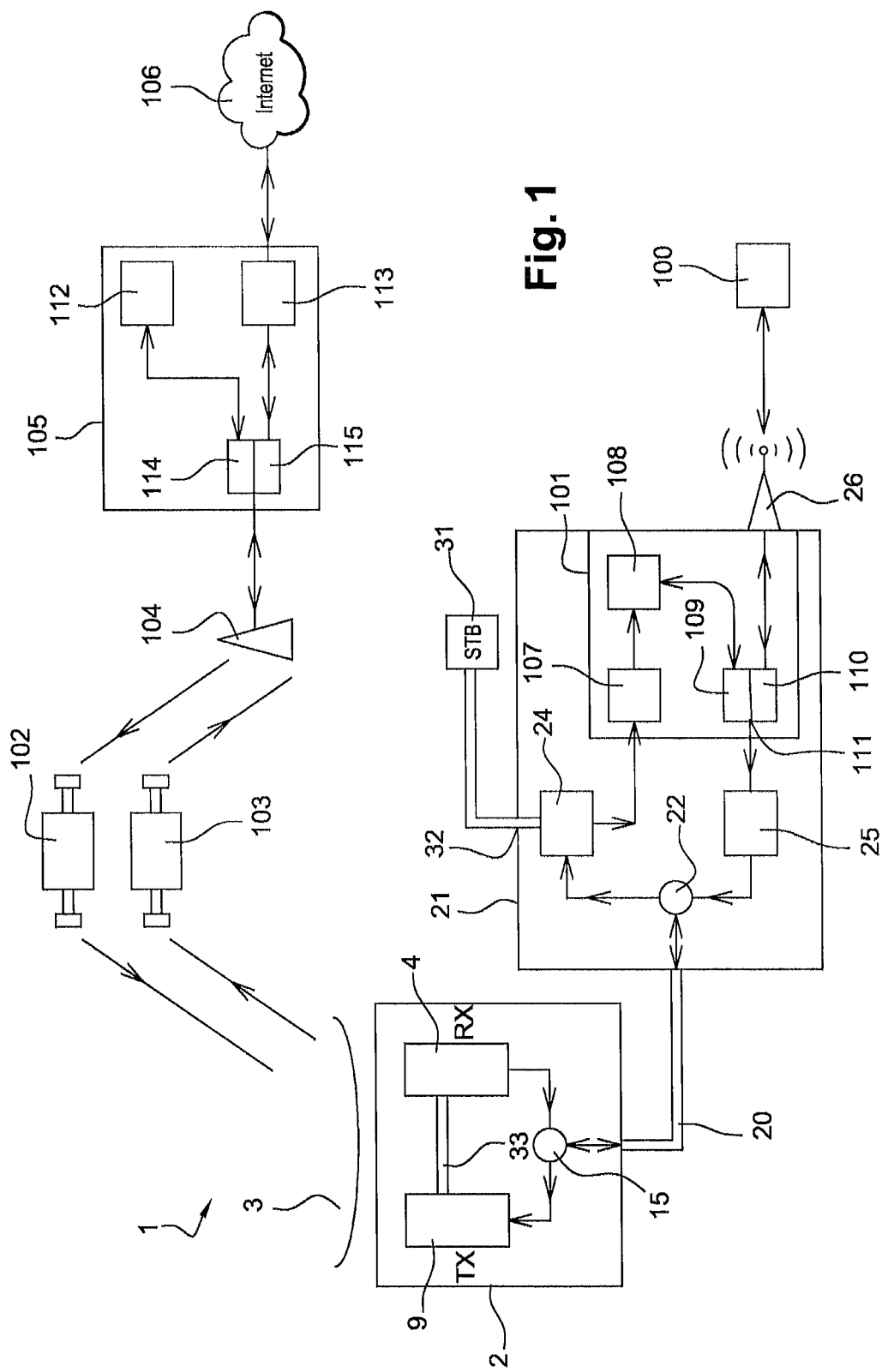

device; and the content is recovered and stored by the client device in the cache memory.

20 Claims, 2 Drawing Sheets

(51) Int. Cl.
*H04L 29/06* (2006.01)
*G06F 16/958* (2019.01)
*G06F 16/955* (2019.01)
*H04N 21/222* (2011.01)
*H04N 21/4782* (2011.01)

(52) U.S. Cl.
CPC ............ *H04L 67/141* (2013.01); *H04L 67/42* (2013.01); *H04N 21/222* (2013.01); *H04N 21/4782* (2013.01); *H04N 21/6143* (2013.01)

(58) Field of Classification Search
CPC ............ G06F 17/30896; H04N 21/222; H04N 21/4782; H04N 21/6143; H04N 7/088; H04N 21/61; H04M 2207/18; H04M 1/72552; H04M 1/72561; H04W 88/02
USPC ........................................................ 709/203
See application file for complete search history.

(56) References Cited

U.S. PATENT DOCUMENTS

| | | | | |
|---|---|---|---|---|
| 6,697,850 | B1* | 2/2004 | Saunders | H04B 7/18515 709/217 |
| 7,861,275 | B1* | 12/2010 | Vellaikal | H04N 7/17318 725/109 |
| 2003/0085917 | A1* | 5/2003 | Chang | G06F 3/14 715/738 |
| 2007/0099672 | A1* | 5/2007 | Oh | H04M 1/72552 455/566 |
| 2007/0250597 | A1* | 10/2007 | Resner | H04N 7/17318 709/218 |
| 2008/0229024 | A1* | 9/2008 | Plamondon | H04L 67/28 711/126 |
| 2011/0153937 | A1* | 6/2011 | Annamalaisami | G06Q 10/10 711/118 |
| 2011/0289108 | A1* | 11/2011 | Bhandari | G06F 17/30905 707/769 |
| 2012/0185783 | A1* | 7/2012 | Avellan | H04N 21/222 715/760 |
| 2012/0282854 | A1* | 11/2012 | Arcidiacono | H04H 40/90 455/3.02 |
| 2012/0331042 | A1* | 12/2012 | Shin | H04L 67/42 709/203 |
| 2013/0013673 | A1* | 1/2013 | Ahmed | H04L 29/06 709/203 |
| 2013/0080701 | A1* | 3/2013 | Markovitz | H04B 7/18517 711/115 |

* cited by examiner

METHOD FOR THE RECOVERY OF CONTENT CORRESPONDING TO A URL ADDRESS BY A CLIENT DEVICE

CROSS REFERENCE TO RELATED APPLICATIONS

This application is the U.S. National Stage of PCT/EP2013/071650, filed Oct. 16, 2013, which in turn claims priority to French Patent Application No. 1260262 filed Oct. 26, 2012, the entire contents of all applications are incorporated herein by reference in their entireties.

The present invention relates to a method for the recovery of content such as an HTML page corresponding to a URL address by a client device. The method according to the invention finds a particularly interesting application in the case of an installation for receiving satellite signals having available a very efficient forward link (high bit rate) and a very limited return link (low bit rate).

At present, the broadcasting of digital television programmes by satellite link (for example according to one of the norms DVB-S, DVB-S2 or DVB-SH) is extensively used throughout the world. Numerous devices are installed in the homes of millions of users. The devices installed are mainly receiving devices which comprise an external unit including a parabolic reflector which focuses the modulated microwave signals, onto the source, known as receiver, of an LNB ("Low Noise Block"), the LNB transforming the microwave signals received into electrical signals in intermediate satellite band in order to transmit them, through the intermediary of a coaxial cable, to the STB satellite decoder. The decoder comprises a demodulation block (DVB-S, DVB-S2 or DVB-SH) which extracts a "useful" modulated signal in the modulated signal transmitted on the coaxial cable and demodulates the extracted "useful" signal. The demodulated "useful" signal can, for example, be used for the display of video images on a television screen.

Offers for broadcasting digital television programmes by satellite link are today essentially purely passive, that is to say "one-way services".

It may nevertheless prove to be useful to be able to offer services requiring a return link with a limited bit rate; this is the case for example of interactive services (votes, consumption of contents with conditional access by exchange of keys, orders for new services such as video on demand). Moreover, this return link can find particularly interesting applications in the field of machine to machine (or M2M) communications to control certain devices (alarm, heating, etc.) and/or to recover data measured by sensors or meters (gas, electricity, etc.) present within homes. A known solution to this problem consists in using a return link using an ADSL type connection supplied by fixed telephone operators (STN or "Switched Telephone Network") or a GPRS/UMTS type connection supplied by mobile telephone operators. This solution thus requires supplementary material as well as an additional subscription; furthermore, telephone switching is not particularly adapted to the transmission of not very voluminous messages such as vote or order messages (relatively high cost, network saturation problems, etc.). Moreover, the territorial coverage of these terrestrial networks is limited.

Another solution consists in using high bit rate two-way satellite terminals, but the cost of the equipment and the subscription may be too high for an application that only uses a very low transmission rate.

Most satellite television offers do not incorporate a return link. It is possible nevertheless to cite an example of two-way television broadcasting system by satellite described in the patent document EP0888690; this system uses a forward link in wide Ku band and a return link in narrow L band. This system is bulky, complex and expensive in so far as it requires the presence of two reflectors (for each Ku and L band) or a dedicated reflector comprising a reflector able to receive signals in Ku band and incorporating an L band transmission antenna. This system also leads to the presence of two physical data transmission links, one from the antenna in Ku band to the decoder inside the house and the other from the decoder to the antenna in L band. It will easily be understood that this type of installation leads to a complete change of the standard systems currently equipping homes and a not insignificant additional cost.

Another example of system of two-way television broadcasting by satellite is described in the patent application WO2011076791 filed by the applicant. This system uses a forward link in wide Ku or Ka band and a return link in narrow S band or in C band, the signals being multiplexed on a same coaxial cable. The gain of the reflector to receive the microwave signals in Ku or Ka band is used to transmit the signals in return link in the S band or the C band.

In the situations evoked above, the return link is a return link in very narrow band with a reduced bit rate. It will thus be understood that the use of such a return link is today limited to applications such as interactive services and do not enable access to the internet, e.g. browsing on the Web. Normal internet access is in fact based on the TCP/IP protocol; the latter requires a certain bit rate level and a limited latency for the return link so as to assure the sending of acknowledgements specific to this protocol. Consequently, such a protocol operates with great difficulty with a rate restricted return link and with a significant latency (for example greater than 1s).

A known solution to this problem in the case of satellite networks consists in using TCP accelerators so as to improve the performances of the TCP/IP protocol on a link with a significant latency. The accelerator attempts to reduce the number of acknowledgements without however deleting all of the acknowledgements. The accelerator does not delete further the requests to establish a connection with the use of a SYN synchronisation flag. Consequently, even in the presence of a TCP accelerator, the strong imbalance between a forward link and a return link makes very difficult the use of the TCP/IP protocol which requires numerous forward/return transmissions via the sending of requests and acknowledgements and thus an intensive use of the unsuitable return link.

In this context, the present invention aims to provide a method for the recovery of content such as an HTML page corresponding to a URL address by a client device in a system having a very high performance forward link and a return link limited in terms of bit rate.

To this end, the invention proposes a method for the recovery of content in the form of an HTML page corresponding to a URL address by a client device comprising the following steps:
- on the basis of a URL address corresponding to said content, the client device checks for the presence of the content of the URL address in a memory of the client device;
- in the absence of the content of the URL address in the memory, the client device creates a short message including the URL address;
- the message is transmitted by the client device to a server device according to a one-way transmission protocol without establishing a given connection;

the server device downloads the content corresponding to said URL address from the internet network;

said content is analysed by the server device and the server device downloads from the internet network elements, such as images and scripts, for which the link is contained in said content;

the server device creates a single file incorporating said content as well as the previously downloaded elements;

said content as well as the elements previously downloaded by the server device are transmitted to the client device in the form of said single file via a one-way protocol with coding without acknowledgement;

said single file is received by the client device;

the client device recovers and stores said single file in said memory.

Thanks to the invention, advantageously a client device and a server device located respectively at a user terminal and a terrestrial station are used. The client device sends a request corresponding to a request for access to content such as a web page associated with a URL address. This request is made in the form of a single short message using for example a modulation technique based on a spread spectrum protocol such as a multiple random access asynchronous protocol with band spreading by modulation of the SPREAD SPECTRUM ALOHA type (such a protocol is for example described in the document ETSI TS 102 721-3). This short message may also be sent by SMS ("Short Message Service") using a terrestrial cellular network.

Generally speaking, sending a short message is taken to mean the fact of using a technology making it possible to send a limited number of messages per day, each with less than 2000 octets per message, with a significant latency, and without prior establishment of a "connection" (for example via the exchange of a "handshake"), the emission time of a message being less than or equal to 1s.

According to a preferential embodiment of the invention, the short message including the URL address uniquely comprises one or more packets of the "data link" of layer 2 of the OSI model. Thus, when the client device sends said message, it does not specify an addressee address. This preferential embodiment of the invention is particularly interesting in the case of communication by satellite between the client device and the server device. The short message could advantageously comprise uniquely a single packet of the "data link" layer 2.

According to another embodiment of the invention, the sending of the short message including the URL address by the client device to the server device could comply with the UDP (User Datagram Protocol).

The server device receives the URL address and is going to act as a proxy server by recovering the content (i.e. the web page) associated with the URL address on the internet. Once the content has been recovered (as well as, if need be, the images and scripts for which the link is contained in the page, which are necessary for the display), the server device transmits to the client device a file incorporating the content in the form of a single transmission, using a one-way protocol with coding without acknowledgement such as one of the protocols used for "push" (also called "datacast") technology. The client device is going to store the content and act as a proxy-cache towards the user. The user communicates directly via its user terminal with the client device while using his internet browser: the user has "the impression" of browsing on the internet using the TCP/IP protocol.

It will be noted that the client device is preferably incorporated in a device operating in transmission and in reception capable both of transmitting short messages (the subject of the invention) but also of receiving modulated signals (for example satellite signals) such as TV signals. The client device incorporates in this case a demodulator enabling the demodulation of the signals received in forward link by satellite link operating for example according to the norm DVB-S2 (ETSI EN 302 307 v1.2.1 Digital Video Broadcasting (DVB); Second generation framing structure, channel coding and modulation systems for Broadcasting, Interactive Services, News Gathering and other broadband satellite applications) and a modulator for the creation of short messages (for example a modulator operating according to a multiple random access asynchronous protocol according to the norm described in the document ETSI TS 102 721-3: "Satellite Earth Stations and Systems. Air Interface for S-band Mobile Interactive Multimedia (S-MIM); Part 3: Physical Layer Specification, Return Link Asynchronous Access.")

The method according to the invention may also have one or more of the following characteristics, considered individually or according to any technically possible combinations thereof:

the method according to the invention comprises a step of the client device extracting from said single file the content as well as previously downloaded elements for which the link is contained in said content, storing said content and said previously downloaded elements in the memory of the client device, and making available to a user terminal said content and said previously downloaded elements;

the method according to the invention comprises a step of the server device creating a single file incorporating said content, said content being transmitted in the form of said file by the server device to the client device via said one-way protocol with coding without acknowledgement;

the method according to the invention comprises a step of the server device checking for the presence of the content of the URL address in a memory of the server device such that said downloading from the internet network by the server device of the content corresponding to said URL address takes place in the absence of the content of the URL address in the memory;

the content is an HTML page, said method comprising the step of analysing said content by the server device and, if need be, downloading from the internet network by the server device elements such as images and scripts for which the link is contained in said content; put another way, if the URL address corresponds to a web page, the server device is going to download from the internet network the content referenced by the HTML code (images, Javascript script, etc.);

said server device sends said elements asynchronously, said client device being ready to receive said elements and to store them in its memory;

the method according to the invention comprises the following steps:

attempting to open the link associated with the URL address on the browser of a user terminal;

transmission of a DNS request from said user terminal to the client device;

the client device checks for the presence of the server name associated with the DNS request in a local data base of the client device;

if the server name is present in said data base, transmission by the client device to the user terminal of the IP address already associated with said server name;

if the server name is not present in said data base, creation by the client device of a temporary IP address associated with said server name then transmission by the client device to said user terminal of said temporary IP address and recording of said temporary IP address in said data base;

attempting to establish a TCP connection by the user terminal with the server corresponding to said temporary IP address, said client device substitutes for the server by allocating itself said temporary IP address such that the TCP connection is established between the user terminal and the client device;

transmission of a HTTP request including the URL address by the user terminal to the client device, the reception of the URL address by the client device bringing about said step of said client device checking for the presence of the content of said URL address in a memory of the client device;

recovery of the content by the client device and sending of the content to the user terminal through the TCP connection established.

said one-way protocol with coding without acknowledgement is one of the protocols used for "push", also called "datacast", technology;

said transmission of the message by the client device to the server device is carried out by satellite transmission, said method comprising the following steps:

uplink transmission by the client device of said message incorporated in a modulated signal to the satellite;

downlink transmission by the satellite of a signal incorporating said modulated signal incorporating the message to a terrestrial station connected to the server device;

the modulated signal incorporating the message transmitted by the client device is modulated according to a spread spectrum protocol operating according to a multiple random access asynchronous protocol with spectrum spreading;

said transmission of the content by the server device to the client device is carried out by a satellite transmission;

said client device creates said message including said URL address in a compressed format;

said server device ignores the message when it has already sent the requested content asynchronously and when the client device has transmitted said message before having received the content;

said client device receives and saves in its "cache" memory all the content sent asynchronously by the server. Thus, if the forward link is a broadcast or multicast type link (thus received by many client devices at the same time), such a step makes it possible to fill the "cache" memories of the client devices, in increasing the probability that the content is already there when the user requests it;

said server device marks certain files incorporating the content with one or more indicators such as flags so that they are received and stored by several client devices at the same time. This targeting using indicators makes it possible to increase the probability of satisfying a request of the user while using the "cache" memory of the client device.

The present invention also relates to a client device and a server device for the implementation of the method according to the invention.

Figure 2:
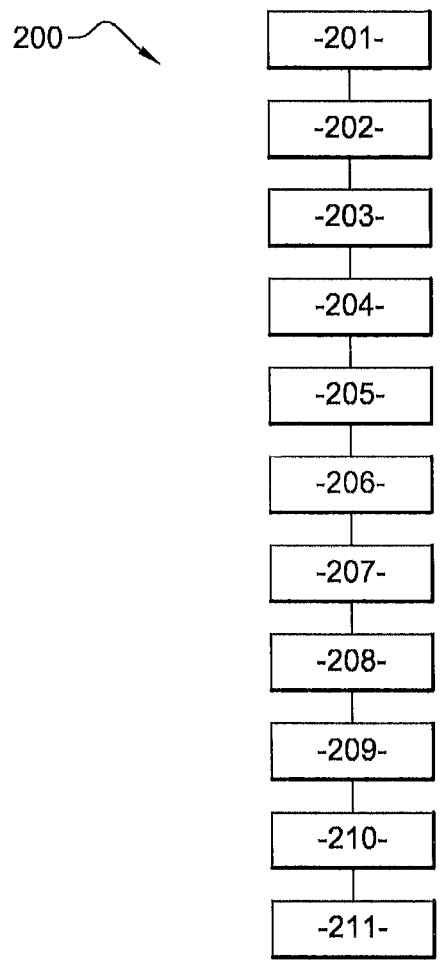

Other characteristics and advantages of the invention will become clear from the description that is given thereof hereafter, for indicative purposes and in no way limiting, with reference to the appended figures:

FIG. 1 schematically represents a transmitting/receiving installation for the implementation of the method according to the invention;

FIG. 2 illustrates the different steps of the method according to the invention.

FIG. 1 schematically represents a transmitting/receiving installation 1 for the implementation of the method according to the invention. It is understood that the installation 1 is only given for illustrative purposes and that numerous variants are possible for the implementation of the method without going beyond the scope of the present invention.

The transmitting/receiving installation 1 comprises:

a parabolic reflector 3 able to receive signals received from a first satellite 102 and to transmit signals to a second satellite 103;

a transmitting/receiving unit 2 (for example outside a house);

a coaxial cable 20;

a case 21 (for example intended to be accommodated inside the house).

The parabolic reflector 3 receives for example signals from the satellite 102 in Ku band (10.7 GHz-12.75 GHz) and transmits signals to the satellite 103 in C band (5.85-6.42 GHz) or in Ka band (29.5-30 GHz); it will be noted that the information concerning the frequencies used is given for purely illustrative and non-limiting purposes. Moreover, even though the invention is here described with two satellites, it is understood that the use of a single and same satellite for the forward link and the return link is also possible.

The transmitting/receiving unit 2 comprises:

an LNB block 4;

a transmission block 9;

a microwave coupler/uncoupler of radio signals 15.

It may prove to be worthwhile to use an added device 33 of the transmission/reception block 9 on the LNB 4 of the parabolic receiver already equipped, pointed and adjusted without it being necessary to modify the mounting or the adjustment of the existing antenna. Such an added device 33 is for example described in the patent application FRO8/56940.

The case 21 comprises:

a coupler/uncoupler 22;

a modulator 25;

a demodulator 24;

a client device 101, the characteristics of which will be set forth in the remainder of the description;

means 26 of wireless connection to a local network of the WiFi type able to assure an interface between the client device 101 and a user terminal 100;

an outlet 32 able to deliver signals demodulated by the demodulator 24 to a satellite decoder 31 also called STB ("Set Top Box").

The coaxial cable 20 connects the case 21 via its coupler/uncoupler 22 and the transmitting/receiving unit 2 via its coupler/uncoupler 15.

The demodulator 24 is for example a demodulator operating according to the norm DVB-S2.

The modulator 25 operates for example according to a multiple random access asynchronous protocol with band spreading by modulation of the SPREAD SPECTRUM ALOHA type optimised so that the satellite hub can use interference elimination means (such a protocol is for example described in the norm described in the document ETSI TS 102 721-3: "Satellite Earth Stations and Systems.

Air Interface for S-band Mobile Interactive Multimedia (S-MIM); Part 3: Physical Layer Specification, Return Link Asynchronous Access.").

The set of signals is coupled on the single coaxial cable 20.

The installation 1 is based on a part operating in forward link making it possible to receive TV signals and data in Ku band transmitted by terrestrial station (satellite hub) 104 (equipped with a DVB-S2 modulator/encapsulator and a demodulator operating according to a multiple random access asynchronous protocol with band spreading) to the satellite 102, and a return link in C or Ka band from the satellite 103 to said station 104 enabling interactive services to be put in place (votes, consumption of contents with conditional access by exchange of keys, orders for new services such as video on demand).

An important imbalance exists in terms of bit rate between the forward link and the return link such that the use of the TCP/IP protocol in a reliable and manner is not applicable.

The method according to the invention is going to advantageously use this return link to enable a user equipped with a user terminal 100 (for example a Smartphone, a PC or a touch sensitive tablet computer) equipped with a web browser connected to the client device 101 to have access to the content of the HTML pages via its browser. To do so, the hub 104 is equipped with a server device 105 connected to the internet network 106, the characteristics of which will be set forth in the remainder of the description.

The different steps of the method 200 according to the invention are illustrated with reference to FIG. 2.

The client device 101 comprises:
an assembly 111 comprising a DHCP 109 (Dynamic Host Configuration Protocol) server and a DNS 110 (Domain Name System) server;
a cache memory 108;
client means 107 of receiving a stream of data in push mode connected to the demodulator 24.

The server device 105 comprises:
a cache memory 112;
internet connection means 113;
means 114 of transmitting a stream of data in push mode;
means 115 of receiving messages sent by the terminals.

We start here from the hypothesis that the client device 101 is configured as HTTP proxy server for the browser of the terminal 100. This configuration may be manual, i.e. through a response to a DHCP request if the user terminal supports this technology (WPAD "Web Proxy Auto Discovery").

According to a step 201, the user terminal 100 transmits a HTTP request including the URL address (for which it seeks to obtain the content, typically a web page) to the client device 101.

According to a step 202, the reception of the URL address by the client device 101 leads to the client device 101 checking for the presence of the content of said URL address in its cache memory. If the content is present, the HTML page corresponding to the URL address is directly transmitted to the user terminal via the TCP connection established. This case may for example arise if the page has already been requested by the user.

According to a step 203, in the absence of the content of the URL address in its cache memory, the client device 101 creates a short message including the URL address. To send this message, the client device 101 uses for example the modulator 25 operating according to a multiple random access asynchronous protocol with band spreading by modulation of the SPREAD SPECTRUM ALOHA type. It should be noted that the client device 101 can also carry out a prior step of compression of the data to be sent for example by using a ZIP algorithm so as to only obtain a single short message incorporating the URL address, even if the URL address is very long. As will be seen more clearly hereafter, the message is then going to be sent via the return link of the installation 1 (here in C or Ka band). The invention is not however limited to a return satellite channel and it is also possible to create a short message of SMS type which will then be transmitted by a return terrestrial channel (GPRS or GSM-SMS connection). It will be noted here that the forward and return links may be totally uncoupled; at the extreme, the message may be transmitted as a series of numerals composed on a telephone line with a keyboard (i.e. tones of the telephone are used in return link). Similarly, it is also perfectly possible to envisage other possible scenarios, for example that the client device that sends the request is not the same as that which receives the requested content.

According to a step 204, the message is then transmitted by the client device 101 to the server device 105 according to a connectionless one-way transmission protocol. As indicated previously, the message is for example sent on the return link of the installation 1 such that the message transits via the satellite 103 then is recovered by the hub 104. The server device 105 is either incorporated in the hub 104 or communicates therewith. The server device 105 is going to use the demodulator operating according to multiple random access asynchronous protocol with band spreading to recover the URL address.

According to a step 205, the server device 105 checks for the presence of the content of the URL address in its cache memory.

According to a step 206, in the absence of the content of the URL address in its cache memory, the server device 105 connects to the internet network 106 to download the web page corresponding to the URL address.

According to a step 207, the server device 105 can also carry out the pre-fetching by recovering information that the user is likely to wish to download in the near future. To do so, the server device 105 analyses the downloaded HTML web page to find the images and other elements for which the link is contained in said HTML page. The HTML page and the associated elements/images are downloaded and stored in the cache memory of the server device 105.

According to a step 208, the server device 105 then creates then a single file (for example a file compressed in .zip format) including the HTML page as well as the pre-fetched elements/images.

According to a step 209, the server device is going to use its means of transmitting a stream of data in push mode to transmit the file via a protocol used for "push" (also called "datacast") technology; that is to say a one-way protocol with coding without acknowledgement. This "datacat" protocol may require additional operations such as the addition of error correction codes so as to guarantee a very high probability of error-free transmission. The file as such is transmitted via a physical level protocol such as the DVB-S2 while transiting for example via the satellite 102.

The principle of the broadcasting of contents in push mode is that there is no connection to initiate, and the content may be received by several or all of the client devices at the same time.

According to a step 210, the client means for receiving a stream of data in push mode of the client device 101 incorporate software means which permanently listen to and receive what is broadcast by the server device. Thus, the client device 101 recovers the HTML page corresponding to the URL address as well as the elements of said page for which the link is contained in the page. Once recovered, the page and the elements are stored in the cache memory of the client device 101.

According to a step 211, the user terminal 100 that communicates with the client device via its TCP connection receives the HTML page. Thanks to the pre-fetching carried out, the user terminal 100 can also have rapid access to the information items targeted by the links contained in said page and stored in the cache memory of the client device 101.

Figure 3:
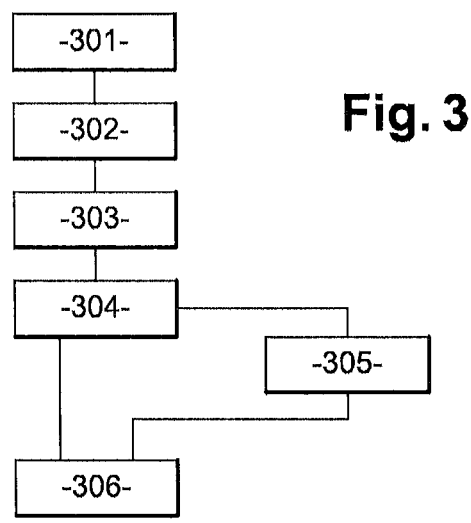

If the client device 101 is not configured as proxy browser, a possible mechanism is illustrated in FIG. 3.

According to a first step 301, the client device 101 which comprises a DHCP server receives a DHCP request from the terminal 100 and allocates a local IP address for the terminal 100; it records this address associated with the terminal in its cache memory. The client device 101 transmits its own IP address as DNS server and gateway by default to the terminal 100.

According to a step 302, the terminal 100 transmits a DNS request to the client device 101 corresponding to the URL address captured in the browser.

According to a step 303, the client device 101 checks for the presence of the name of the server associated with the DNS request in its cache memory.

According to a step 304, if the server name associated with the DNS request is present in the cache memory, the client device 100 transmits to the user terminal 100 the IP address already associated with the server name.

According to a step 305, if the server name is not present in the cache memory, the client device 100 creates a temporary IP address associated with the server name then transmits it to the user terminal 101; this temporary IP address is also recorded in the cache memory. The temporary IP address is a fictive address which in fact does not correspond to the IP address of the server name, the only condition being that this temporary address does not belong to the local network of the user terminal 100. Put another way, the client device 101 dupes the user terminal 100 by transmitting to it a "false" address as if it had resolved the name of the server.

According to a step 306, the user terminal 100 tries to establish a TCP connection with the server corresponding to the temporary IP address; in reality, the client device 101 substitutes for the server by allocating itself said temporary IP address such that the TCP connection is established between the user terminal 100 and the client device 101; the client device 101 thus simulates a TCP connection between the user terminal 100 and the server associated with the URL address. The step 201 described with reference to FIG. 2 is again found at this level.

It is understood that in the description of the steps of the method as illustrated in FIGS. 2 and 3, the steps are not necessarily sequential; the different equipment (especially the client device 101 and the server device 105) each follow their own steps, said devices being able to operate in parallel.

The client device and the server device are intended for the management of the different operations to be executed to implement the method according to the invention. To do so, they comprise several software means (i.e. applications) of which certain are dedicated to the implementation of the invention. In other embodiment examples, these software means could be re-placed by specific electronic circuits.

Obviously, the invention is not limited to the embodiment that has just been described.

Thus, the invention has been more particularly described in the case of use in C or Ka band but it may also be used in satellite S band (1980-2010 MHz and 2170-2200 MHz).

Moreover, even if the forward link has been more specifically described in the case of a DVB-S2 modulation/demodulation, it is understood that other modulations/demodulations may be used such as the norms DVB-T, DVB-T2, DVB-S or DVB-SH.

Similarly, the steps of pre-fetching can go beyond the links contained in the requested page such that the server device can also download particularly requested pages ("best of the web") which will then be stored in the cache memories of the server device and client devices. One refers in this case to an "advanced caching" type operation. To do so, the server can use indicators that are recognised by all of the clients targeted by this content: these clients are going to receive and store the content even if the user has not requested it.

The invention claimed is:

1. A method for recovering content as a hypertext markup language (HTML) page corresponding to a URL address by a client device, comprising:
determining, by a client device, whether content corresponding to an URL address is present in a memory of the client device;
responsive to the determination that the content is not present in the memory, creating, by the client device, a short message including the URL address;
transmitting said short message by the client device to a server device according to a one-way transmission protocol without establishment of a connection;
downloading, by the server device, the content corresponding to said URL address from an internet network;
analysing said content by the server device and downloading, by the server device from a network, elements for which one or more links are contained in said content;
creating, by the server device, a single file incorporating said content as well as the downloaded elements;
transmitting said content as well as the downloaded elements to the client device as said single file via a one-way protocol with coding without acknowledgement;
receiving, by the client device, said single file; and
recovering a HTML page and storing, by the client device, said single file in said memory.

2. The method according to claim 1, further comprising:
extracting, by the client device, from said single file the content as well as the downloaded elements for which the one or more links are contained in said content;
storing said content and said downloaded elements in the memory of the client device; and
making available to a user terminal said content and the downloaded elements.

3. The method according to claim 1, further comprising:
checking, by the server device, for the presence of the content corresponding to the URL address in a memory of the server device such that said downloading from the internet network by the server device of the content corresponding to said URL address takes place in the absence of the content of the URL address in the memory.

4. The method according to claim 3, further comprising:
sending, by the server device, said elements asynchronously, said client device being ready to receive said elements and to store them in its memory.

5. The method according to claim 1, further comprising:
attempting to open a link associated with the URL address on a browser of a user terminal;
transmitting a DNS request from said user terminal to the client device;
checking, by the client device, for the presence of a server name associated with the DNS request in a local data base of the client device;
if the server name is present in said data base, transmitting, by the client device to the user terminal, an IP address already associated with said server name;
if the server name is not present in said data base, creating, by the client device, a temporary IP address associated with said server name and then transmitting, by the client device to said user terminal, said temporary IP address and recording said temporary IP address in said data base;
attempting to establish a TCP connection by the user terminal with a server corresponding to said temporary IP address, said client device substituting for the server by allocating itself said temporary IP address such that the TCP connection is established between the user terminal and the client device;
transmitting a HTTP request including the URL address by the user terminal to the client device;
checking for the presence of the content of said URL address in the memory of the client device responsive to reception of the URL address by the client device; and
recovering the content by the client device and sending the content to the user terminal via the established TCP connection.

6. The method according to claim 1, wherein said one-way protocol with coding without acknowledgement is a protocol used for push technology.

7. The method according to claim 1, wherein said transmission of the short message by the client device to the server device is carried out by a satellite's transmission, said method further comprising:
transmitting, by the client device, said short message incorporated in a modulated signal to the satellite; and
transmitting, by the satellite, a signal incorporating said modulated signal incorporating the short message to a terrestrial station connected to the server device.

8. The method according to claim 7, wherein the modulated signal incorporating the message transmitted by the client device is modulated according to a multiple random access asynchronous protocol with spectrum spreading.

9. The method according to claim 1, wherein said transmission of the content by the server device to the client device is carried out by satellite transmission.

10. The method according to claim 1, wherein said client device creates said short message including said URL address in a compressed format.

11. The method according to claim 1, wherein said server device ignores the short message when it has already sent the content asynchronously and that the client device has transmitted said short message before having received the content.

12. The method according to claim 1, wherein said server device marks certain files incorporating the content with one or more indicators so that the files are received and stored by several client devices at the same time.

13. The method according to claim 12, wherein said client device receives and records in its memory all the files that are marked by the server device with an indicator present in a pre-established list.

14. A client device comprising components for the implementation of the method according to claim 1.

15. A server device comprising components for the implementation of the method according to claim 1.

16. The method according to claim 1, wherein the elements are images and scripts.

17. The method according to claim 12, wherein the indicators are flags.

18. The method according to claim 1, wherein said short message comprises one packet at layer 2 of an open systems interconnection (OSI) model.

19. The method according to claim 1, wherein the client device is configured as a hypertext transfer protocol (HTTP) proxy server for a browser of a user terminal communicatively coupled to the client device.

20. The method according to claim 1, wherein the client device comprises a set top box (STB) for decoding satellite signals received at the client device.

* * * * *